Figure 1:
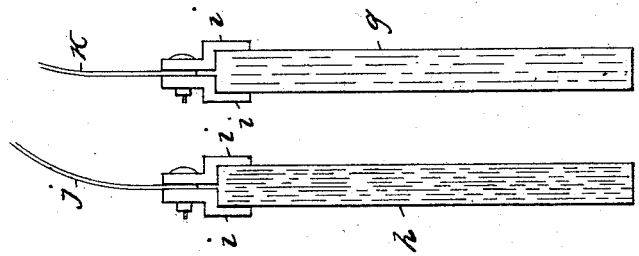

(No Model.)

A. K. EATON.
METHOD OF PREPARING THE ELEMENTS OF STORAGE BATTERIES.

No. 311,236.          Patented Jan. 27, 1885.

WITNESSES:

INVENTOR

BY

ATTORNEY

UNITED STATES PATENT OFFICE.

ASAHEL K. EATON, OF BROOKLYN, NEW YORK.

METHOD OF PREPARING THE ELEMENTS OF STORAGE-BATTERIES.

SPECIFICATION forming part of Letters Patent No. 311,236, dated January 27, 1885.

Application filed October 2, 1882. (No model.)

*To all whom it may concern:*

Be it known that I, ASAHEL K. EATON, of the city of Brooklyn, in the county of Kings and State of New York, have invented certain new and useful Improvements in the Preparation of the Plates or Elements of Storage-Batteries and their Combination for Effective Work; and I hereby declare the following to be a description of my invention in such full, clear, concise, and exact terms as will enable any one skilled in the art or science to which it appertains or with which it is most nearly connected to make and use the same, reference being had to the accompanying drawings, making part of this specification, and to the letters and figures marked thereon.

In the use of spongy lead and the oxides of lead in the construction of storage-batteries, as described in an application for a patent filed by me March 1, 1882, and numbered 54,035, I have employed many devices for holding the spongy or pulverulent materials firmly together and in contact with the conducting-surface, varying according to different conditions involved in the construction of the forms of the battery. For instance, instead of the form described in my said application, when the different plates are packed closely together with layers of porous material between, it is sometimes desirable to suspend the plates in the electrolytic solution with only that fluid intervening. In such cases it becomes important that each plate should be self-supporting and possess a certain degree of solidity. This I effect by the following means: I take the mixed material produced by the process described in my application for a patent filed August 14, 1882, and numbered 69,314, for the manufacture of peroxide of lead and acetate of lead at that stage of the process when the reaction has taken place between the red lead and acetic acid, and to the resulting mixture I add fragments of metallic zinc and agitate the mixture. In other words, I take ordinary red lead (minium) and add thereto acetic acid. This mixture is agitated for a short time, when the red lead will be found to have lost its bright color, and to have become changed to a dark brown—that is, a portion of the oxide has been dissolved in the acetic acid, forming acetate of lead, and the balance remains peroxide of lead. To this mixture I then add fragments of metallic zinc and agitate the mixture. The action of the zinc upon acetate of lead precipitates spongy lead, which, as it is formed, mixes with the peroxide of lead. In this process I make use of an excess of red lead, in which case the resulting compound is a mixture of red lead, peroxide of lead, and sponge-lead. I have found that the presence of red lead in the mixture causes it to harden after a short exposure to the air and form a hard porous mass. I press this mixture into plates of the required form and size, which, after exposure, are ready for use as elements of the storage-battery. The presence of the peroxide is not necessary to effect this change; the red oxide alone, mixed with sponge-lead, will effect the consolidation. Hence in the construction of the battery I use the plate made of peroxide of lead, red oxide, and sponge for my positive electrode, and the plate composed only of red oxide and sponge-lead for the negative electrode. Solid plates made in this way have such cohesiveness that they may be suspended in the electrolytic solution without the support of intervening layers of porous material. In other cases I make my plates after the following method: My negative electrode—a thin perforated lead plate—is covered, as in the application first described, but on one side only, with any desired thickness of sponge-lead. Upon this another sheet of lead is laid and the edges folded down upon each other, so as to make a thin lead case closed at all the edges. The burrs left by the operation of punching the perforations are preferably turned inside, as they aid in holding the sponge in place. The positive electrode is made in the same way, if sponge alone is used; but if peroxide of lead, or a mixture of that with sponge, is made use of, the following is the method for preparing the plate: A perforated plate of thin lead is covered on both sides with a paste of peroxide of lead or of a mixed paste of sponge and peroxide, and a sheet of asbestus board or its equivalent, somewhat smaller than the lead sheet, is laid upon each of the paste-covered surfaces. Upon each of these asbestus sheets is laid a sheet of perforated lead and the edges locked together, as in the first case.

The different electrodes are illustrated by the accompanying drawings as far as the nature of the invention will permit its illustration by a drawing.

By *h* of Figure 1 is shown a solid positive electrode composed of a mixture of red lead, sponge-lead, and peroxide of lead. By *g* of the same figure is shown a solid negative electrode composed of a mixture of red lead and sponge-lead.

Figure 2:
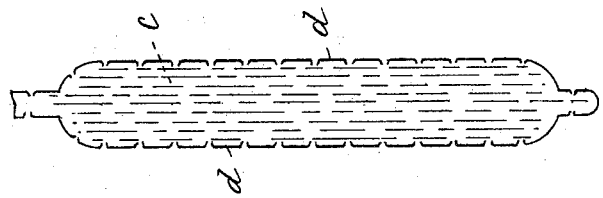

By Fig. 2 is shown a negative electrode consisting of sponge-lead C, inclosed by two sheets of thin perforated lead, *d d*, the burrs of the perforations being left on the inside surfaces to assist in holding the sponge-lead.

Figure 3:
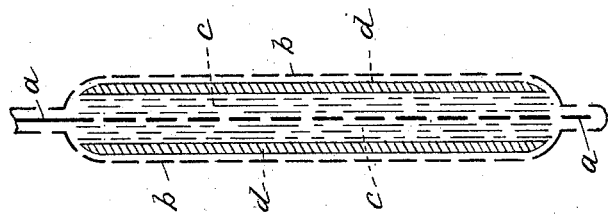

By Fig. 3 is shown a positive electrode consisting of a thin central perforated plate, *a*, covered on both sides with a paste of peroxide of lead or a mixed paste of sponge and peroxide of lead and a sheet of perforated asbestus board, *d*, on each side, inclosed by thin sheets of perforated lead locked together on all sides, forming the completed electrode, the electrical connection being made by inserting the conductor between the plates, as at J K, or by any other of the well-known means of making such connections.

It will be understood that these drawings are mere outline-illustrations, intending to show some of the forms in which my invention may be put, but which forms may be varied in a great variety of ways in the practical application of the invention.

Having thus described my invention, I claim and desire to secure by Letters Patent—

The process substantially herein described of producing a mixture of sponge-lead and peroxide of lead useful in the manufacture of storage-batteries, which process consists in treating red lead with acetic acid, and of then treating the resulting product with zinc or its equivalent, substantially as described.

ASAHEL K. EATON.

Witnesses:
AMOS BROADNAX,
WM. H. BROADNAX.